(12) United States Patent
Sakashita et al.

(10) Patent No.: US 8,933,908 B2
(45) Date of Patent: Jan. 13, 2015

(54) MOBILE TERMINAL DEVICE AND SENSOR MODULE

(75) Inventors: Hiroaki Sakashita, Kawasaki (JP);
Tatsuhito Araki, Kawasaki (JP);
Manabu Hongo, Kawasaki (JP);
Hiroaki Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 96 days.

(21) Appl. No.: 13/233,697

(22) Filed: Sep. 15, 2011

(65) Prior Publication Data

US 2012/0071204 A1 Mar. 22, 2012

(30) Foreign Application Priority Data

Sep. 22, 2010 (JP) ................. 2010-212823

(51) Int. Cl.
*H04W 88/02* (2009.01)
*H04M 1/22* (2006.01)
*G06F 1/16* (2006.01)
(Continued)

(52) U.S. Cl.
CPC .............. *H04M 1/22* (2013.01); *G06F 1/1662* (2013.01); *G06F 1/169* (2013.01); *G06F 3/0202* (2013.01); *G06F 3/03547* (2013.01); *H04M 2250/12* (2013.01); *H04M 2250/22* (2013.01)
USPC ...................... 345/174; 178/18.11; 178/18.06; 361/679.27; 361/679.28; 361/679.3; 455/575.3

(58) Field of Classification Search
CPC ........... G06F 3/01; G06F 3/041; G06F 3/044; G06F 3/045; G06F 3/048; G09F 5/10; G09F 13/08; G02F 1/1333; G09G 5/00
USPC ............ 345/169, 173, 174, 156, 690; 439/77, 439/492; 178/18.11, 18.06; 362/97.2, 97.1; 349/62, 58; 29/622; 455/575.3; 361/679.27, 679.28, 679.3
See application file for complete search history.

(56) References Cited

U.S. PATENT DOCUMENTS

| | | | |
|---|---|---|---|
| 7,748,862 B2 * | 7/2010 | Kim | 362/97.2 |
| 8,330,734 B2 * | 12/2012 | Oohira | 345/173 |
| 2006/0026821 A1 * | 2/2006 | Stevenson et al. | 29/622 |

(Continued)

FOREIGN PATENT DOCUMENTS

| | | |
|---|---|---|
| JP | 2006-209418 | 8/2006 |
| JP | 2007-133698 | 5/2007 |

(Continued)

OTHER PUBLICATIONS

Office Action of Japanese Patent Application No. 2010-212823 dated Jan. 14, 2014 with Partial Translation.

(Continued)

*Primary Examiner* — Lun-Yi Lao
*Assistant Examiner* — Johny Lau
(74) *Attorney, Agent, or Firm* — Fujitsu Patent Center (57) ABSTRACT

A mobile terminal device includes a face panel provided on an exterior of a housing, a sensor module that detects that the face panel is touched, where the sensor module is provided on a more inward side of the housing than the face panel, a light-emitting unit provided with a light-emitting member that emits light when the sensor module detects that the face panel is touched, where the light-emitting unit is provided on a more inward side of the housing than the sensor module, and a connection unit that makes an electrical connection between the sensor module and the light-emitting unit.

5 Claims, 7 Drawing Sheets

(51) Int. Cl.
*G06F 3/02* (2006.01)
*G06F 3/0354* (2013.01)

(56) References Cited

U.S. PATENT DOCUMENTS

| | | | |
|---|---|---|---|
| 2006/0172588 A1* | 8/2006 | Peng | 439/492 |
| 2008/0122802 A1* | 5/2008 | Furuhashi et al. | 345/174 |
| 2008/0125076 A1 | 5/2008 | Suzuki et al. | |
| 2008/0167094 A1* | 7/2008 | Dinh et al. | 455/575.3 |
| 2008/0180390 A1* | 7/2008 | Yoshikawa | 345/156 |
| 2008/0188099 A1* | 8/2008 | Takahashi | 439/77 |
| 2008/0230283 A1* | 9/2008 | Yoon et al. | 178/18.11 |
| 2009/0085889 A1* | 4/2009 | Hyeon | 345/174 |
| 2009/0322709 A1 | 12/2009 | Lee et al. | |
| 2011/0242039 A1* | 10/2011 | Kalis et al. | 345/174 |

FOREIGN PATENT DOCUMENTS

| | | |
|---|---|---|
| JP | 2007-311044 A | 11/2007 |
| JP | 2008-131597 A | 6/2008 |
| JP | 2009-099067 A | 5/2009 |
| JP | 2010-15557 | 1/2010 |
| JP | 2010-16711 | 1/2010 |
| JP | 2010-055177 | 3/2010 |

OTHER PUBLICATIONS

JPOA—Office Action of Japanese Patent Application No. 2010-212823 dated Oct. 7, 2014 with Partial English Translation.

* cited by examiner

MOBILE TERMINAL DEVICE AND SENSOR MODULE

CROSS-REFERENCE TO RELATED APPLICATIONS

This application is based upon and claims the benefit of priority from the prior Japanese Patent Application No. 2010-212823 filed on Sep. 22, 2010, the entire contents of which are incorporated herein by reference.

FIELD

The embodiments discussed herein are relates to a mobile terminal device and a sensor module.

BACKGROUND

In recent years, some cell phones and mobile terminal devices have been configured so that light is emitted from a light-emitting member such as a light emitting diode (LED) installed in a housing when a face panel is touched by a user's finger, pen, or the like. In this kind of the mobile terminal device, for example, an electrostatic sensor is installed in the housing and detects a change in electrostatic capacity to make the light-emitting member emit light when the face panel is touched. Thus, the mobile terminal device may realize various light-emitting modes depending on manners of touching a face panel. A user may enjoy various illuminations realized by the mobile terminal device.

Exemplary mobile terminal devices are disclosed in Japanese Laid-open Patent Publication Nos. 2008-131597, 2009-99067, and 2007-311044.

Figure 7:
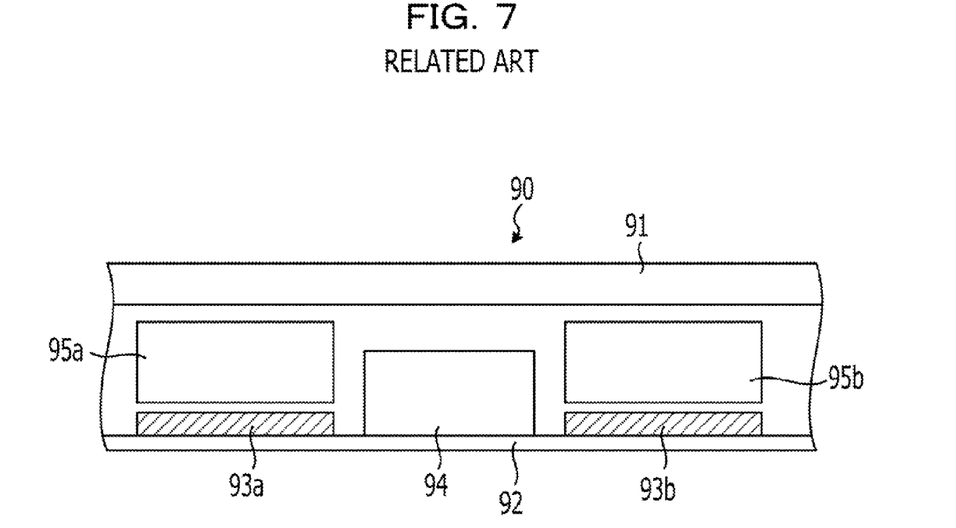
FIG. 7 is a diagram illustrating an internal structure of the conventional mobile terminal device.

However, the aforementioned conventional mobile terminal device has a problem in that the sensitivity of the electrostatic sensor is low. This problem will be described with reference to FIG. 7. FIG. 7 is a diagram illustrating an internal structure of the conventional mobile terminal device. As illustrated in FIG. 7, the mobile terminal device 90 includes a face panel 91 to be touched by a user. The mobile terminal device 90 includes a flexible printed circuit board 92, electrostatic sensors 93a and 93b, a LED 94, and spacers 95a and 95b in housing. The electrostatic sensors 93a and 93b and the LED 94 are connected to the flexible printed circuit board 92. The spacers 95a and 95b are placed in the housing to avoid formation of unnecessary spaces in the housing.

When a user's finger, a pen, or the like touches the face panel 91, the electrostatic sensors 93a and 93b, which are formed in the vicinity of the position where the finger or the like is touched, detect a change in electrostatic capacity. The LED 94 emits light when the electrostatic sensors 93a and 93b located near the LED 94 detect a change in electrostatic capacity.

As illustrated in FIG. 7, the distance from the face panel 91 to the electrostatic sensors 93a and 93b is long. Thus, the electrostatic sensors 93a and 93b may be difficult to detect a change in electrostatic capacity even when the finger or the like touches the face panel 91. The mobile terminal device 90 may cause a decrease in sensitivity of the electrostatic sensors 93a and 93b due to the internal structure of the mobile terminal device 90. The emission of light from the LED 94, which is interlocked with detection by the electrostatic sensors 93a and 93b, may be effectively represented in a preferable manner.

SUMMARY

According to an aspect of the invention, a mobile terminal device includes a face panel provided on an exterior of a housing, a sensor module that detects that the face panel is touched, where the sensor module is provided on a more inward side of the housing than the face panel, a light-emitting unit provided with a light-emitting member that emits light when the sensor module detects that the face panel is touched, where the light-emitting unit is provided on a more inward side of the housing than the sensor module, and a connection unit that makes an electrical connection between the sensor module and the light-emitting unit.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, exemplary mobile terminal device and sensor module according to embodiments of the present application will be described in detail with reference to the attached drawings. However, these embodiments will not restrict the mobile terminal device and sensor module disclosed in the present application.

Figure 1:
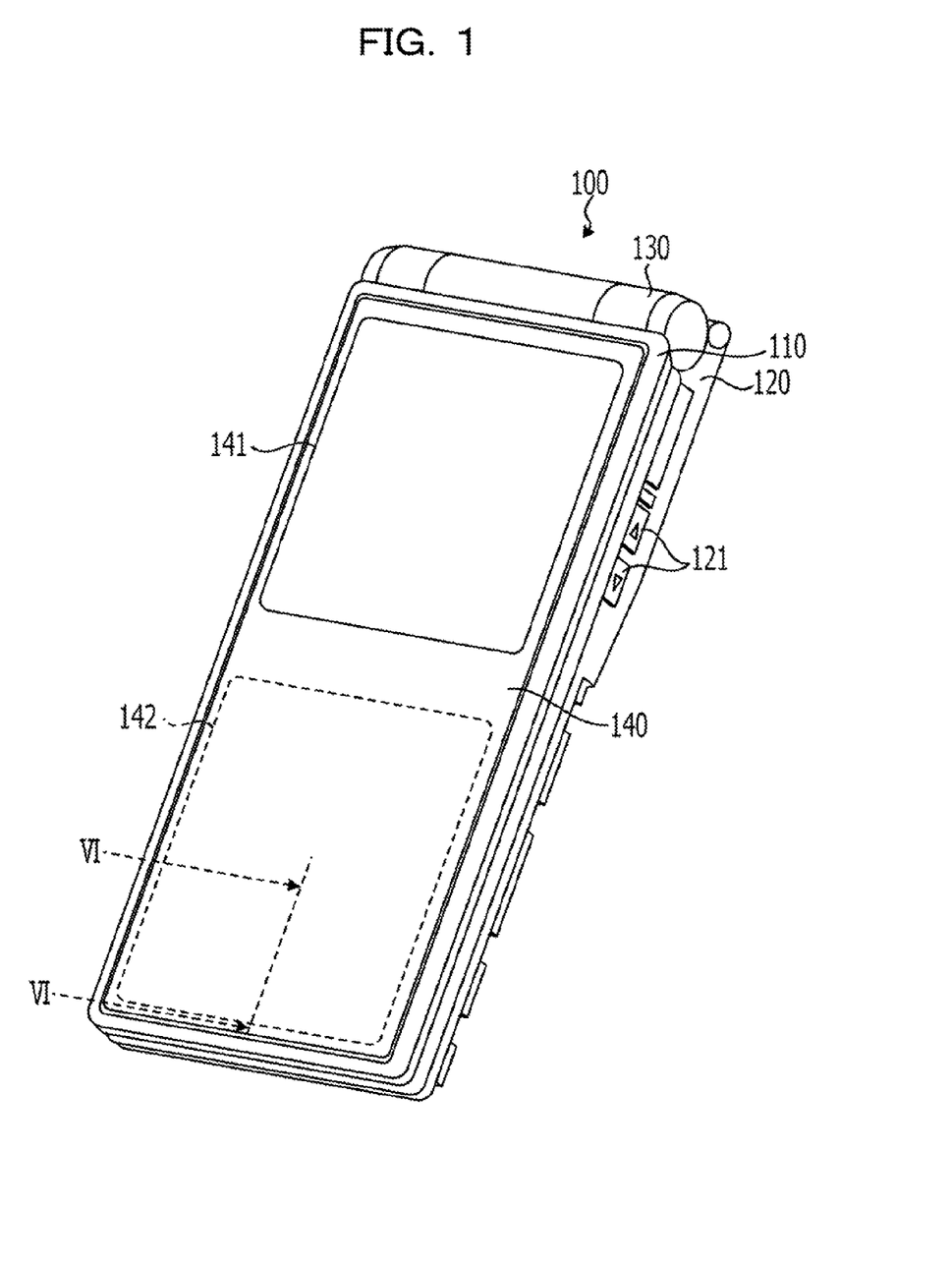
FIG. 1 is a diagram illustrating an external appearance of the mobile terminal device of the present embodiment.

An external appearance of a mobile terminal device according to the present embodiment will be described with reference to FIG. 1. FIG. 1 is a diagram illustrating an external appearance of the mobile terminal device of the present embodiment. As illustrated in FIG. 1, the mobile terminal device 100 of the present embodiment is a clamshell cell phone having a movable housing 110 and a fixed housing 120. The movable housing 110 is connected to the fixed housing 120 in a foldable manner by a connection unit 130. FIG. 1 illustrates an exemplary state where the movable housing 110 is being folded on the fixed housing 120.

A face panel 140 is mounted on the surface of the movable housing 110. The face panel 140 serves as an exterior of the movable housing 110 in the folded state. The face panel 140 includes a display unit 141 and a contact unit 142. The display unit 141 is, for example, a liquid crystal display, displaying various kinds of information. For example, the display unit 141 may display information for notifying a user of incoming e-mail when the e-mail is received and displays information about a caller when receiving a call.

The contact unit 142 is an area that emits light when being touched with a user's finger, a pen, or the like. For example, the contact unit 142 makes the user-touched position emit light. For example, the contact unit 142 makes the user-touched position emit light after an elapse of predetermined time from being touched by the user.

The contact unit 142 may be not only provided for emission of light but also provided as an operation unit. For example, the contact unit 142 may display a received e-mail or the like on the display unit 141 when the finger or the like is moved from side to side and up and down or the like while touching the contact unit 142. The user may browse e-mails or the like only by touching the contact unit 142.

The fixed housing 120 includes an operation unit (not illustrated) with keys, such multifunctional keys, decision keys, dialing keys, and numeric keys, different side keys 121, and the like. Each of the movable housing 110 and the fixed housing 120 may be made of a lightweight, high strength material, such as magnesium alloy, and formed in the shape of a box.

Figure 2:
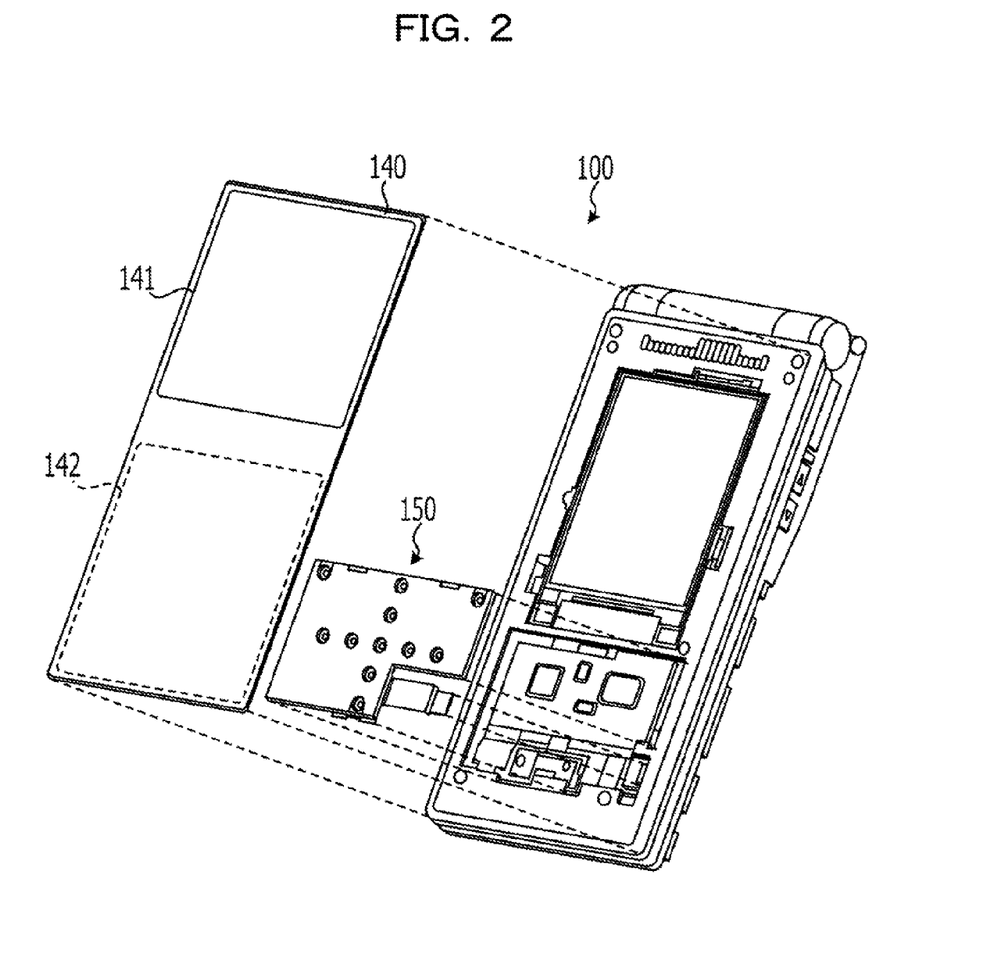
FIG. 2 is a diagram illustrating a view of the mobile terminal device from the movable housing.
Figure 3:
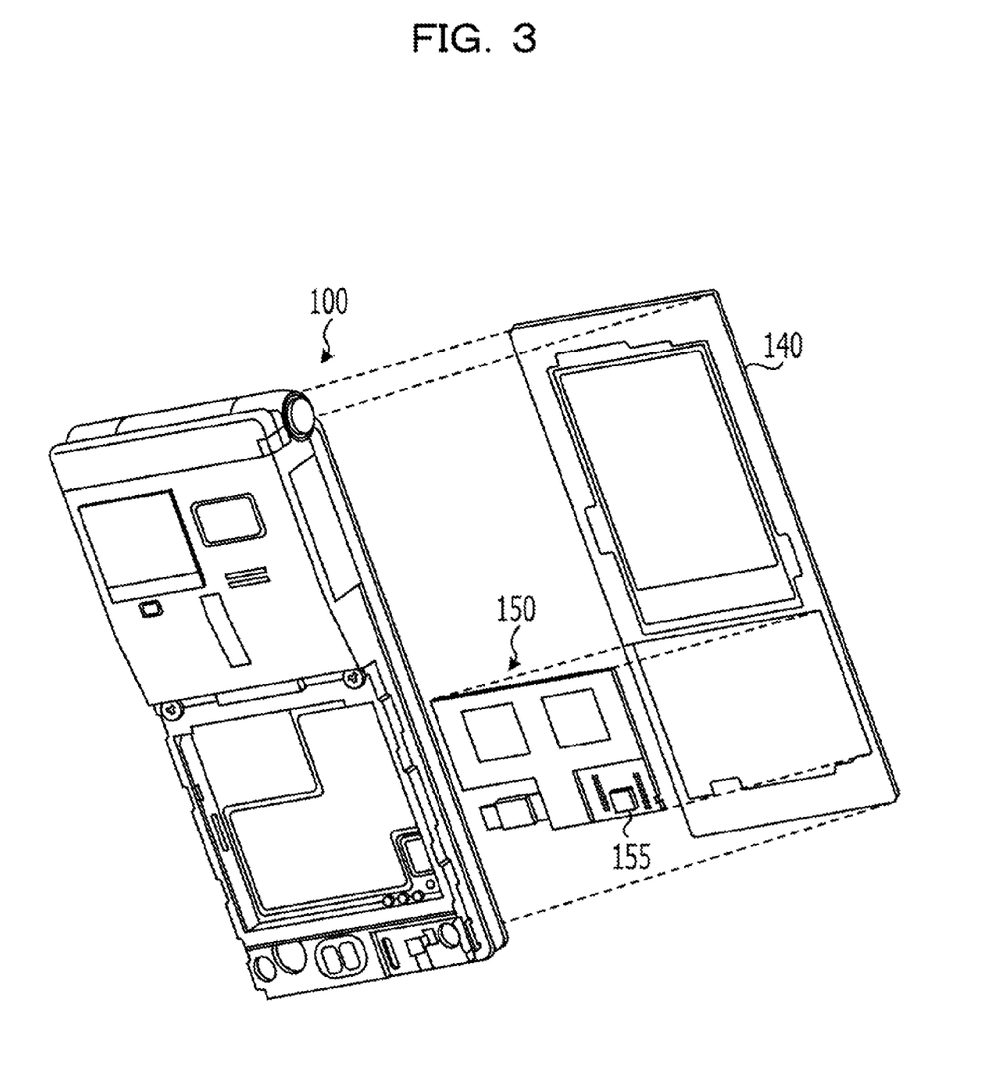
FIG. 3 is a diagram illustrating a view of the mobile terminal device from the fixed housing.

The movable housing 110 of the present embodiment will be described with reference to FIG. 2 and FIG. 3. These figures are diagrams each illustrating the internal structure of the mobile terminal device 100 of the present embodiment. FIG. 2 is a diagram illustrating a view of the mobile terminal device 100 from the movable housing 110. FIG. 3 is a diagram illustrating a view of the mobile terminal device 100 from the fixed housing 120.

As illustrated in FIG. 2 and FIG. 3, the movable housing 110 includes a sensor module 150 in the inside thereof. In the movable housing 110, for instance, the sensor module 150 is placed on the board on which various electronic components are mounted and the face panel 140 is placed on the sensor module 150. The sensor module 150 detects whether the contact unit 142 of the face panel 140 is touched by the finger or the like. When the contact unit 142 is touched, the sensor module 150 causes emission of light.

Figure 4:
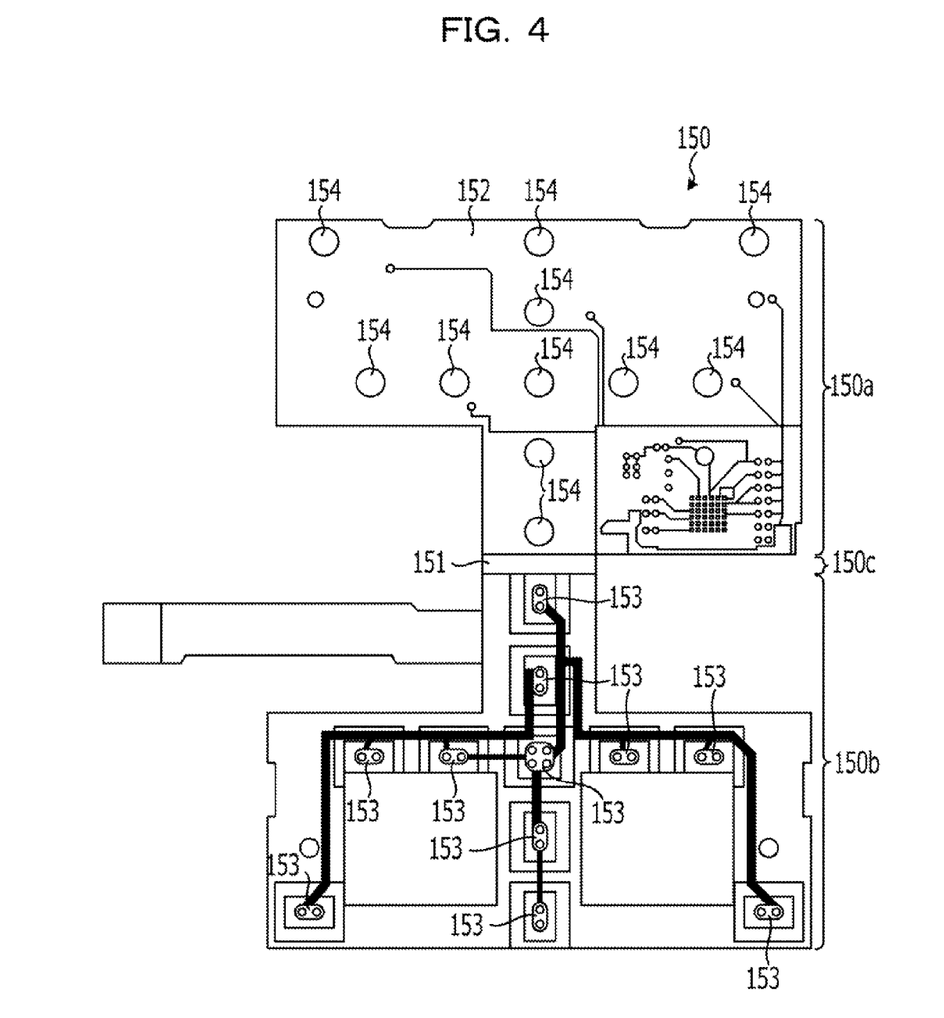
FIG. 4 is a plan view illustrating the sensor module of the present embodiment.

The sensor module 150 will be described with reference to FIG. 4. FIG. 4 is a plan view illustrating the sensor module 150 of the present embodiment. As illustrated in FIG. 4, the sensor module 150 constitutes part of the flexible printed circuit board 151, including a region 150a where a sensor member 152 is placed, a region 150b where a light-emitting member 153 is placed, and a region 150c extending between the region 150a and the region 150b. The sensor module 150 is constructed of the sensor member 152 and the light-emitting member 153 which are connected through the flexible printed circuit board 151.

The sensor member 152 is, for example, an electrostatic sensor or a pressurization sensor, and detects that the face panel 140 is touched. When the sensor member 152 is the electrostatic sensor, the sensor member 152 detects a change in electrostatic capacity to recognize that the face panel 140 is touched by the user's finger, a pen, or the like. When the sensor member 152 is the pressurization sensor, the sensor member 152 detects a change in pressure on the sensor member 152 itself to recognize that the face panel 140 is touched by the user's finger, a pen, or the like.

The light-emitting member 153 is an LED or the like and emits light when the sensor member 152 detects that the face panel 140 is touched. Depending on the type of the mobile terminal device 100, the light-emitting member 153 may emit light immediately after the sensor member 152 detects that the face panel 140 is touched. Therefore, like the example illustrated in FIG. 4, the sensor member 152 and the light-emitting member 153 are preferably mounted on the same flexible printed circuit board 151. The mobile terminal device 100 is able to make the light-emitting member 153 promptly emit light when the sensor member 152 detects that the face panel 140 is touched.

To make the region 150a on which the sensor member 152 is mounted and the region 150b on which the light-emitting member 153 face to each other, the sensor module 150 of the present embodiment is folded at the region 150c between the region 150a and the region 150b. As illustrated in FIG. 4, a hole 154 is formed in the region on which the sensor member 152 is mounted so that the hole 153 is located at the position facing to the light-emitting member 153 in the state where the sensor module 150 is being folded. When the sensor module 150 is folded at the region 150c, the region 150a and the region 150b are arranged opposite to each other and the sensor member 152 and the light-emitting member 153 are arranged opposite to each other. Since the region 150a and the region 150b are arranged opposite to each other, the light-emitting member 153 and the hole 154 are arranged opposite to each other. Light emitted from the light-emitting member 153 may pass through the hole 154. Thus, the mobile terminal device 100 allows the light to reach the face panel 140.

Figure 5:
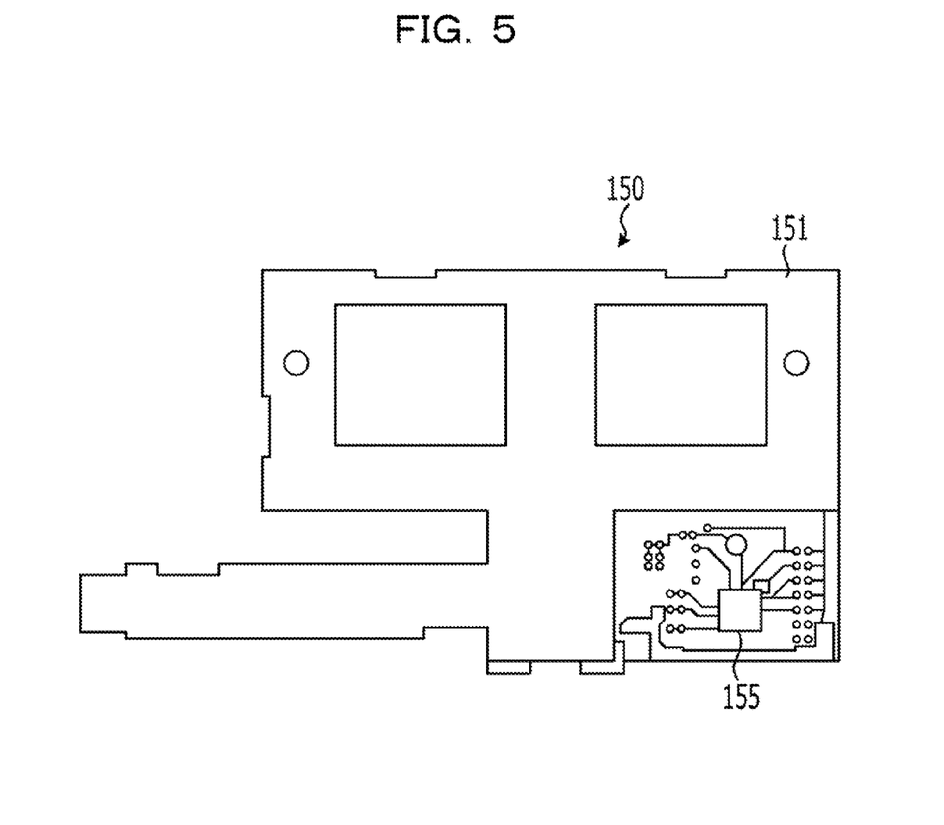
FIG. 5 is a plan view illustrating the sensor module in the folded state.

FIG. 5 is a plan view illustrating the sensor module 150 in the folded state. As illustrated in FIG. 5, the sensor module 150 is placed in the movable housing 110 while being folded at the region 150c illustrated in FIG. 4. The sensor module 150 is arranged in the movable housing 110 so that the sensor member 152 is located on the face panel 140 and the light-emitting member 153 is located on the board of the movable housing 110.

Figure 6:
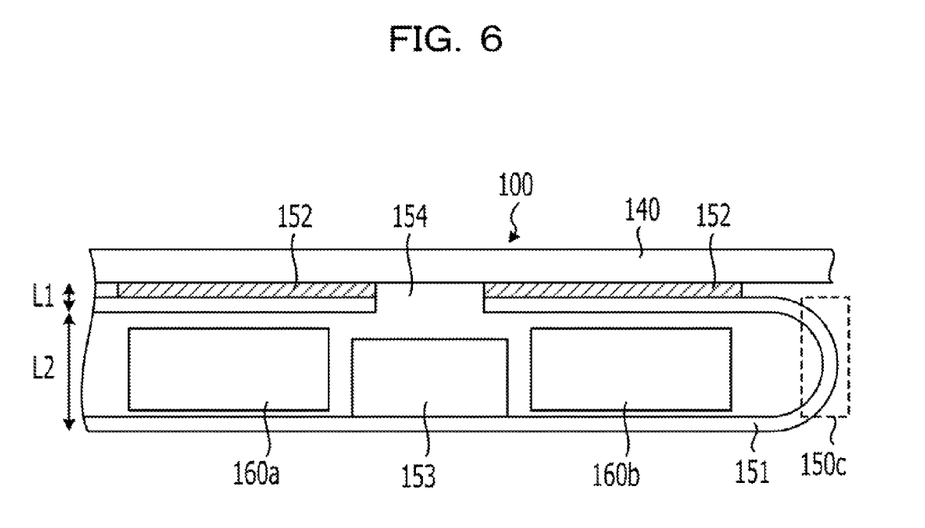
FIG. 6 illustrates a cross section along the line VI-VI in FIG. 1.

An internal structure of the movable housing 110 of the present embodiment will be described with reference to FIG. 6. FIG. 6 illustrates a cross section along the line VI-VI in FIG. 1. In the mobile terminal device 100, as illustrated in FIG. 6, the sensor member 152 is mounted in a first layer L1 in the movable housing 110, which is located more inwardly than the face panel 140. In the mobile terminal device 100, the light-emitting member 153 is mounted in a second layer L2 in the movable housing 110, which is located more inwardly than the first layer L1. In the movable housing 110, the second layer L2 in which the light-emitting member 153 is mounted, the first layer L1 in which the sensor member 152 is mounted, and the face panel 140 are stacked on top of one another.

The sensor member 152 and the light-emitting member 153 are electrically connected through the flexible printed circuit board 151. As described above, the sensor module 150, in which the sensor member 152 and the light-emitting member 153 are mounted on the same flexible printed circuit board 151, is folded and the folded sensor module 150 is mounted on the mobile terminal device 100. In the mobile terminal device 100, the sensor member 152 is arranged directly under the face panel 140 and connected to the sensor member 152 and the light-emitting member 153 through the same flexible printed circuit board 151.

The region 150a on which the sensor member 152 is arranged and the region 150b on which the light-emitting member 153 is arranged may have different thicknesses of the flexible printed circuit board 151. For example, the thickness of the flexible printed circuit board 151 on the region 150a on which the sensor member 152 is arranged may be greater than the region 150b on which the light-emitting member 153 is arranged. This configuration ensures the strength of the board suitable for mounting a control IC chip 155 (see FIGS. 3 and 5) that controls outputs of the electrostatic sensor and the sensor module and contributes a reduction in thickness of the sensor module when the region 150a and the region 150b are stacked. For example, the control IC chip 155 is arranged on the lower right side in the region 150a in FIG. 4. In the sensor module of the present embodiment, the sensor member 152, such as the electrostatic sensor, and the control IC chip are arranged on the region 150a on the same side and the light-emitting member 153 is arranged on the region 150b on the opposite side. Thus, a reduction in thickness of the sensor module is attainable.

When a user's finger, a pen, or the like touches the face panel 140 in the vicinity of the sensor member 152, the sensor member 152 detects a change in electrostatic capacity. When a change in electrostatic capacity is detected by the sensor member 152, the light-emitting member 153 located directly under the sensor member 152 emits light. When the face panel 140 is touched, the mobile terminal device 100 is able to brighten the vicinity of the touched position.

As illustrated in FIG. 6, spacers 160a and 160b are formed in the movable housing 110. The spacers 160a and 160b are inserted into the housing and prevent the formation of spaces in the housing. The spacers 160a and 160b may be light guide plates that allow light emitted from the light-emitting member 153 to pass through the spacers 160a and 160b.

In the example illustrated in FIG. 6, a dispersing material for light diffusion may be applied to the inner surface of the face material 140. The dispersing material may be mixed in the face panel 140. By applying or mixing the dispersing agent, the face panel 140 may make the light from the light-emitting member 153 blurry.

In the example illustrated in FIG. 6, both the face panel 140 and the sensor member 152 may be bonded together using a double bonded tape, a coating material, or the like.

In the mobile terminal device 100 of the present example, the sensor member 152 has a short distance to the face material 140, so that the sensor member 152 may detect that the user's finger or the like is touching the face panel 140 with a high degree of accuracy. The mobile terminal device 100 of the present embodiment may improve the sensitivity of the sensor member 152. As a result, when the finger or the like touches the face panel 140, the light-emitting member 153 is able to prevent the light emitting member 153 may be prevented from a non-emitting state.

As illustrated in FIG. 7, it is difficult to design pattern wiring for the sensor member and the light-emitting member when the sensor material and the light-emitting material are the same region of the flexible substrate. This is because of difficulty in forming pattern wiring in the sensor member and the light-emitting member. In the mobile terminal device 100 of the present embodiment, the sensor module 150 is designed so that the sensor member 152 and the light-emitting member 153 are mounted on different regions of the flexible printed circuit board 151. In the sensor module 150 as illustrated in FIG. 4, for example, the sensor member 152 is mounted on the region 150a of the flexible printed circuit board 151 and the light-emitting member 153 is mounted on the region 150b of the flexible substrate 151. According to the above configuration of the sensor module 150 of the present embodiment, pattern wiring of the sensor member 152 and the light-emitting member 153 may be easily designed.

As described above, the configuration of mobile terminal device 100 of the present embodiment leads to an improvement in sensitivity of the electrostatic sensor and allows pattern wiring to be easily formed on the flexible printed circuit board 151.

In the mobile terminal device 100 of the present embodiment, the sensor member 152 and the light-emitting member 153 are mounted on the same flexible printed circuit board 151. Thus, the light-emitting member 153 is able to emit light promptly when the sensor member 152 detects that the face panel 140 is touched.

In the mobile terminal device 100 of the present embodiment, the hole 154 is formed at the position facing to the light-emitting member 153, so that light emitted from the light-emitting member 153 may pass through the hole 154. In the mobile terminal device 100 of the present embodiment, light emitted from the light-emitting member 153 may reach the face panel 140 without causing a decrease in the amount of the light.

In the above embodiment, part of the exterior of the movable housing 110 is provided with the contact unit 142. In the mobile terminal device of the present embodiment, the contact unit 142 may be not only formed on part of the exterior of the movable housing 110 but also formed on the entire exterior thereof. For example, the mobile terminal device disclosed in the present application is applicable to the case where the contact unit 142 is partially or entirely formed on the exterior of the fixed housing 120.

The above embodiment has been illustrated as an example of forming the hole 154 in the region 150a of the sensor module 150. The mobile terminal device disclosed in the present application is applicable to the case where the hole 154 is not formed and the sensor module used is transparent. In the mobile terminal device disclosed in the present application, the use of a transparent sensor module allows light emitting from the light-emitting material 153 to reach the face panel 140 without causing a decrease in amount of the light even in the case that the hole 154 is not formed.

In the above embodiment, the example in which the movable housing 110 has the display unit 141 has been described. The mobile terminal device disclosed in the present application is also applicable to the case where the movable housing 110 does not have the display unit 141.

In the above embodiment, the example in which the mobile terminal device disclosed in the present application is applied to the clamshell cell phone. Alternatively, the mobile terminal apparatus disclosed in the present application is applicable to any type of cell phones in addition to the clamshell cell phone. For example, the mobile terminal device disclosed in the present application is also applicable to a straight cell phone where a housing is not divided, a slide cell phone where one housing is slidable against the other housing, or the like in a manner similar to the clamshell cell phone.

In the above embodiment, the example in which the mobile terminal device disclosed in the present application has been described as one applied to the cell phone. However, the mobile terminal device disclosed in the present application is not limited to the cell phone. For example, the mobile terminal device disclosed in the present application is applicable to any of various mobile terminal devices, such as a small information processing terminal, a small music reproduction device, a portable TV, or a handheld game machine.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal device, comprising:
a face panel provided on an exterior of a housing;
a flexible printed circuit board, provided in the face panel, including a first planar part, a second planar part, and a curve portion which couples the first planar part and the second planar part so as to create a space between a first surface of the first planar part and a second surface of the second planar part, the first planar part facing the second planar part, the flexible printed circuit board including:
- an electrostatic sensor module, located between the face panel and a third surface of the first planar part on the side of the face panel and opposite to the first surface, that detects that the face panel is touched, and
- a light emitter provided with a light-emitting member, located in the space and on the second surface of the second planar part, that emits light when the sensor module detects that the face panel is touched, wherein the flexible printed circuit board provides an electrical connection between the sensor module and the light-emitting unit, wherein the electrostatic sensor module has a hole formed in the vicinity of a position facing to the light-emitting member.

2. The mobile terminal device according to claim 1, wherein the electrostatic sensor is in contact with the face panel and the third surface of the first planar part.

3. The mobile terminal device according to claim 1, further comprising,
- a first spacer provided on the second surface of the second planar part and between the first surface of the first planar part and the second surface of the second planar part.

4. The mobile terminal device according to claim 3, further comprising,
- a second spacer provided on the second surface of the second planar part and between the first surface of the first planar part and the second surface of the second planar part.

5. The mobile terminal device according to claim 4, wherein the light emitter is provided between the first spacer and the second spacer and lateral to the first spacer and the second spacer.

* * * * *